Aug. 21, 1962   O. E. RINGWALD   3,050,366
PRODUCTION OF SILANE BY THE USE OF A ZINC CATALYST
Filed July 15, 1959
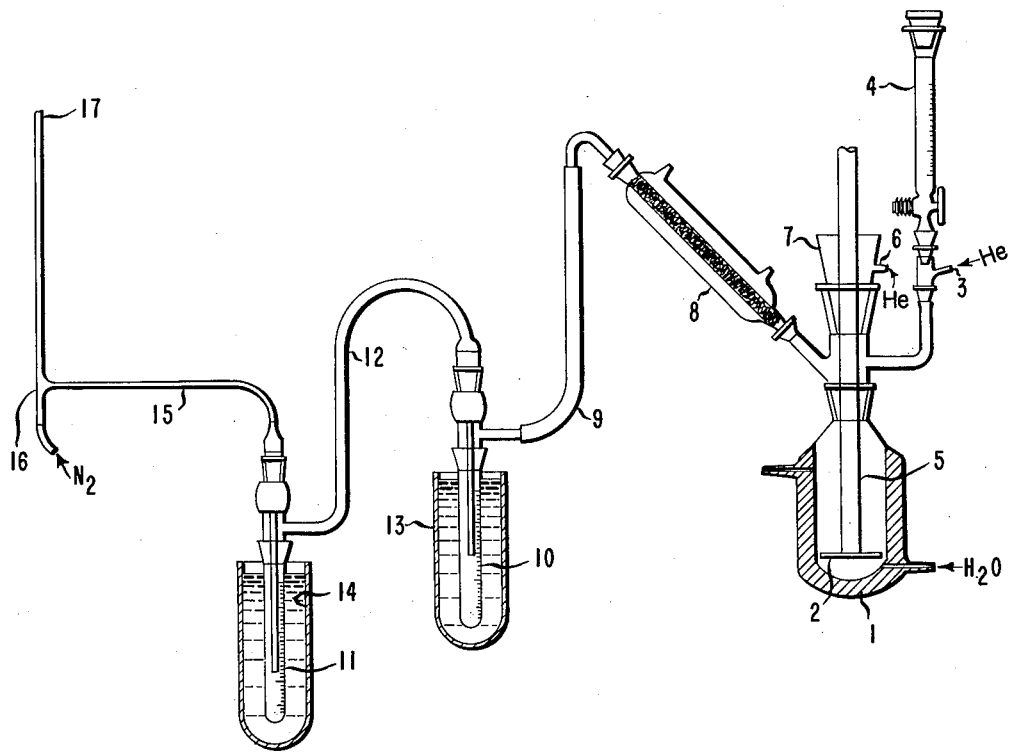
INVENTOR
OWEN E. RINGWALD
BY Francis J. Crowley
ATTORNEY

United States Patent Office 3,050,366
Patented Aug. 21, 1962

3,050,366
PRODUCTION OF SILANE BY THE USE OF A ZINC CATALYST
Owen E. Ringwald, Wilmington, Del., assignor to E. I. du Pont de Nemours and Company, Wilmington, Del., a corporation of Delaware
Filed July 15, 1959, Ser. No. 827,311
13 Claims. (Cl. 23—204)

This invention relates to the substitution of hydrogen atoms for the silicon-bonded halogen atoms in halogen-substituted silane derivatives. For example, it relates to substitution of hydrogen into a silicon tetrahalide to produce monosilane ($SiH_4$).

Halogen-substituted silanes are also referred to as halogenosilanes (e.g., see U.S. Patents 2,406,605 and 2,595,620), and they include such materials as the silicon tetrahalides, the monohalo-, the dihalo-, and the trihalo-silanes and hydrocarbon-substituted derivatives thereof. It is known that the halogen atoms of such compounds can be replaced with hydrogen by chemical reaction. The above-mentioned U.S. Patent 2,595,620 discloses such a replacement by reacting the silane with hydrogen and silicon at temperatures above 400° C. Also, U.S. Patent 2,406,605, referred to above, substitutes hydrogen into silane derivatives by contacting the silane derivative with hydrogen and a hydrogen halide. Another method for effecting this hydrogen substitution is disclosed in J.A.C.S., 69, 2692–2696 (1947), and it reacts the halogen-containing silane with lithium hydride in diethyl ether. However, the use of a less expensive hydride, such as sodium hydride, gives a negligible yield of silane under similar conditions. The present invention provides a process which uses the less reactive metal hydrides in substituting hydrogen for halogen in halogen-containing silanes.

It is an object of this invention to utilize metal hydrides, such as sodium hydride, in an improved process for substituting one or more hydrogen atoms for silicon-bonded halogen atoms in a halogen-substituted silane compound. A particular object is to provide an improved process for producing monosilane by substituting hydrogen for all of the silicon-bonded halogen atoms in a tetrahalosilane. A further object is the economical production of monosilane of such high purity as to be suitable for use in the manufacture of semi-conductor quality silicon.

The objects of this invention are attained by a process comprising contacting a hydride of an alkalinous metal having an atomic number greater than 4 with a halogen-substituted silane compound under anhydrous conditions and in the presence of an ether reaction medium and a zinc catalyst which may be either elemental zinc or a compound of zinc.

The process of this invention can be carried out in standard equipment. It is self-initiating and exothermic. The amount of reactants used is at least a stoichiometric amount of hydride based on the amount of hydrogen substitution contemplated, and preferably there should be an excess of hydride. The amount of ether used is not particularly critical, but it should be present at least in an amount sufficient to maintain fluidity in the reaction mixture. The amount of catalyst used is subject to wide variations, and can range from 1:10 to 15:1 based on the molar ratio of catalyst to the starting silane compound. A preferred range is from 1:8 to 2:1, with a ratio of from 1 mol of catalyst to 2 mols of starting silane being especially preferred. Contact between reactants can be accomplished by agitation, and in a preferred embodiment, a grinding aid or attritive agent, such as rock salt, is added to the reaction mixture to exert an attritive action on the metal hydride, thus exposing fresh reaction surfaces.

The attached drawing is a schematic diagram of an apparatus that may be used to carry out the process of this invention.

The following is a detailed description of the drawing:
Vessel 1 is a 70 ml. enclosed jacketed reaction vessel equipped with a 1½-inch diameter, disc-type stirrer blade 2. Stirrer shaft 5 is sealed by helium introduced through inlet 6 into bearing 7. The vessel is provided with inlets 3 for introducing helium purge gas and a valved measuring burette 4 for introducing ether and liquid reactants (i.e., the halogen-substituted silane). Solid materials (i.e., powdered metal hydride, catalysts, and attritive agent, if used) are added to vessel 1 after purging the reaction system with dry inert gas. The system as shown in the drawing will of course have to be opened to introduce the solid materials. Reaction product gases are evolved through the cold condenser 8 which can be cooled by a Dry Ice-acetone mixture. This condenser returns to the reactor as reflux any ether or unreacted halogen-substituted silane that may be vaporized or entrained during the reaction. The silane product gas is passed through tubing 9 to measuring cold traps 10 and 11 connected by tubing 12. Cold traps 10 and 11 are cooled by liquid nitrogen contained in Dewar flasks 13 and 14, respectively. Any non-condensable gas or silane passing the cold traps is removed through tubing 15, and if monosilane is being produced, it is diluted with nitrogen at T 16 for safety purposes since, under certain conditions, monosilane is highly explosive when mixed with air. This mixture of nitrogen and silane is then discharged through outlet 17 to a hood or other waste collector. However, the major portion, if not all, of the silane can be collected as a solid in the cold traps, and it is measured as a liquid by removing the Dewar flask long enough to allow the silane to liquefy. Practically all silane is found in the first trap 10. If the process of this invention is used solely for the purpose of experimentation, it may be desirable to dispose of any monosilane produced by vaporizing it and burning it in air at outlet 17. If the monosilane does not spontaneously ignite at outlet 17, it should be ignited to avoid formation of an explosive mixture.

In a specific embodiment using the above-described apparatus, sodium hydride is introduced into reaction vessel 1 as a finely divided, oil-coated powder in an amount stoichiometrically equivalent to the amount of silicon tetrachloride to be added from burette 4. Zinc chloride which is used as a catalyst is also placed in reaction vessel 1 in an amount equivalent to 50 mol percent of the $SiCl_4$ to be used. In addition, sufficient ether is added to form a stirrable slurry. The silicon tetrachloride is usually added to the 70 ml. reaction vessel in an amount equivalent to 0.05 gm. mol, and it is introduced at an approximately constant rate based on the evolution of silane product gas. It usually takes about 20 minutes to introduce all of the silicon tetrachloride into the reaction vessel. Cold water is passed through the jacket of the reactor to control the reaction rate and prevent the reaction from proceeding too rapidly. Sodium chloride forms as a by-product in the reaction vessel, and in instances where the formation of this by-product causes the reaction mixture to thicken to such an extent as to impair the effectiveness of the agitator, additional ether or an inert liquid diluent can be added to maintain effective agitation.

For a clearer understanding of the invention, the following specific examples are given. These examples are intended to be merely illustrative of the invention, and not in limitation thereof. Unless otherwise specified, all parts are by weight.

*Example I*

This example deals with the production of monosilane by reducing silicon tetrachloride with sodium hydride using various zinc catalysts, as shown in the table below. The apparatus used was that shown in the drawing. After this apparatus was purged with dry helium, the ether reaction media (more specifically described in the table), sodium hydride powder wet with mineral oil, and zinc catalyst were added to the reaction vessel. In those experiments in which attritive powder was used, it was added along with the metal hydride immediately after it had been heated in an oven or muffle furnace to completely remove moisture. The sodium hydride and catalyst were weighed in a dry box. Zinc chloride, when used, was reagent-grade material which was fused to remove water and then pulverized in a dry box. Other catalysts used in this example were also treated to remove moisture. The water jacket surrounding the reaction vessel was controlled at the temperature indicated in the table by using tap water. Except where otherwise specified in the examples (see Ex. IV), the cold condenser was cooled to approximately $-80°$ C. by the use of a Dry Ice-acetone mixture. In all the experiments, shown in the table of this example, the following amounts of reactants were used:

9.3 grams NaH wet with mineral oil (this is equal to 4.6 gms. of dry NaH or 0.2 gm. mol)
5.7 ml. $SiCl_4$ (equal to 0.05 gm. mol)

For most of the experiments, the rotational speed of the agitator shaft was 9000–13000 r.p.m. (high speed in the table below). $SiCl_4$ was added to the reactor dropwise at an approximately constant rate over a period of about 20 minutes. When silane evolution became too rapid, the addition of the $SiCl_4$ was slowed down, thus causing a decrease in the rate of reaction. Product monosilane was collected in the cold traps as a solid, but it was measured as liquid at its melting point by lowering the Dewar cooling flasks just long enough to allow the silane to liquefy and to obtain a reading as to the volume of product obtained.

*Example I*

| Run No. | 1 | 2 | 3 | 4 | 5 | 6 |
|---|---|---|---|---|---|---|
| Catalyst | No catalyst | No catalyst | $ZnCl_2$ | $ZnCl_2$ | $ZnCl_2$ | $ZnCl_2$. |
| Molar ratio, catalyst:$SiCl_4$ | | | 1:2 | 1:2 | 1:2 | 1:2. |
| Reaction slurry liquid | THF [1] | THF | THF | THF [3a] | THF | Kerosene/THF. |
| Volume of liquid | 20 ml | 18 ml | 30 ml | 6 ml | 30 ml | 20 ml./20 ml. |
| Attritive material | None | NaCl | None | None | NaCl | NaCl. |
| Weight | | 50 g | | | 50 g | 50 g. |
| Mesh size | | −100+200 | | | Powder [3] | Powder. |
| Agitation: | | | | | | |
| Speed | Slow | High | Slow [2] | High | High | High. |
| Temperature (jacket) | 12° C | 20° C | 12° C | 12° C | 17° C | 12° C. |
| Yield, monosilane | 0% | 11% | 42% | 79% | 95% | 89%. |
| Reaction period | 6 hrs | 6 hrs | 2½ hrs | 2 hrs | ⅓ hr | 5 hrs. |

| Run No. | 7 | 8 | 9 | 10 | 11 |
|---|---|---|---|---|---|
| Catalyst | $ZnCl_2$ | No catalyst | $ZnCl_2$ | $ZnCl_2$ | $ZnCl_2$. |
| Molar ratio, catalyst:$SiCl_4$ | 3:4 | | 1:2 | 1:2 | 1:4. |
| Reaction slurry liquid | Diethylether | Diethyleneglycol-dimethyl ether. | Diethylene-glycol dimethyl ether. | Diethylene-glycol dimethyl ether. | THF. |
| Volume of liquid | 50 ml | 20 ml | 30 ml | 45 ml | 40 ml. |
| Attritive material | NaCl | None | None | NaCl | NaCl. |
| Weight | 25 g | | | 25 g | 50 g. |
| Mesh size | Powder | | | Powder | Powder. |
| Agitation: | | | | | |
| Speed | High | Low [4] | Low | High | High. |
| Temperature (jacket) | 12° C | 16° C | 16° C | 12° C | 17° C. |
| Yield, monosilane | 72% | 0% | 31% | 76% | 96%. |
| Reaction period | 6 hrs | 6 hrs | 6 hrs | 2 hrs | 2 hrs. |

| Run No. | 12 | 13 | 14 | 15 | 16 | 17 |
|---|---|---|---|---|---|---|
| Catalyst | No catalyst | $ZnCl_2$ | $ZnF_2$ | $ZnBr_2$ | $ZnBr_2$ | $ZnCO_3$. |
| Molar ratio, catalyst:$SiCl_4$ | | 1:2 | 1:2 | 1:2 | 1:2 | 1:4. |
| Reaction slurry liquid | THF | THF | THF | THF | THF | THF. |
| Volume of liquid | 20 ml | 30 ml | 20 ml | 20 ml | 20 ml | 20 ml. |
| Attritive material | None | None | NaCl | None | NaCl | None. |
| Weight | | | 25 g | | 25 g | |
| Mesh size | | | Powder | | Powder | |
| Agitation: | | | | | | |
| Speed | Low | High | High | Low/high | High | Low/high. |
| Time (hours) | | | | 2 hrs./¾ hr | | 2 hrs./2 hrs. |
| Temperature (jacket) | 50° C | 35° C | 12° C | 13° C | 12° C | 12° C. |
| Yield, monosilane | 0% | 68+% [5] | 50–80% [6] | 38% | 83% | 38%. |
| Reaction period | 6 hrs | ¾ hr | 1 hr | 2¾ hrs | 1 hr | 4 hrs. |

| Run No. | 18 | 19 | 20 | 21 | 22 | 23 |
|---|---|---|---|---|---|---|
| Catalyst | ZnO | ZnO | Zn acetate | Zn stearate | Zn [7] | Brass,[7] 50% Cu, 50% Zn. |
| Molar ratio, Catalyst-$SiCl_4$ | 1:2 | 1:2 | 1:2 | 1:2 | 46:1 | 23:1. |
| Reaction slurry liquid | THF | THF | THF | THF | THF | THF. |
| Volume of liquid | 20 ml | 45 ml | 20 ml | 90 ml | 40 ml | 50 ml. |
| Attritive material | None | NaCl | None | None | Zn | Brass, Zn-Cu. |
| Weight | | 25 g | | | 150 g | 150 g. |
| Mesh size | | Powder | | | Powder | −100. |
| Agitation: | | | | | | |
| Speed | Low/high | High | Low | Low | High | High |
| Time (hours) | 3 hrs./3 hrs | | | | | |
| Temperature (jacket) | 16° C | 12° C | 13° C | 13° C | 17° C | 19° C. |
| Yield, monosilane | 27% | 72% | 32% | 46% | 78% | 70%. |
| Reaction period | 6 hrs | 6 hrs | 2½ hrs | 3 hrs | ½ hr | 3 hrs. |

[1] Tetrahydrofuran.
[2] Paddle type agitator blade used in this run.
[3] Material was in powder form; no measurement of particle size made.
[3a] Four more milliliters of THF added after 1½ hrs. to lower viscosity of slurry.
[4] 600 r.p.m.
[5] Some product lost through trap due to excessive reaction rate.
[6] Estimated yield; some product lost due to plugging of condenser.
[7] Material functions as attritive material as well as catalyst.

Example II

Note.—This example illustrates the use of calcium hydride as the reducing agent. The procedure and apparatus used here was the same as that of Example I, except that 0.1 mol of CaH₂ (dry powder) was substituted for the 0.2 ml of NaH used in Example I.

| Run No | 24 | 25 | 26 | 27 |
|---|---|---|---|---|
| Catalyst | No catalyst | No catalyst | $ZnCl_2$ | $ZnCl_2$. |
| Molar ratio: catalyst-SiCl₄ | | | 1:2 | 1:2. |
| Reaction slurry liquid | THF | THF | THF | THF. |
| Volume of liquid | 20 ml | 18 ml | 25 ml | 85 ml. |
| Attritive material | None | Al powder | None | NaCl. |
| Weight | | 58 grams | | 25 grams. |
| Mesh size | | −100+150 mesh | | Powder. |
| Agitation: | | | | |
| Speed | Low | High | Low | High. |
| Temperature (jacket) | 16° C | 25° C | 16° C | 11° C. |
| Yield, monosilane | 0% | 2% | 19% | 95%. |
| Reaction period | 3 hrs | 7½ hrs | 3 hrs | 5 hrs. |

Example III

Note.—This example illustrates the use of magnesium hydride as the reducing agent. The procedure and apparatus used here was the same as that of Example I, except that 0.1 mol of MgH₂ (dry powder) was substituted for the 0.2 mol of NaH used in Example I.

| Run No | 28 | 29 |
|---|---|---|
| Catalyst | No catalyst | $ZnCl_2$ |
| Molar ratio, catalyst: SiCl₄ | | 3:2 |
| Reaction slurry liquid | THF | THF. |
| Volume of liquid | 20 ml | 70 ml. |
| Attritive material | None | NaCl. |
| Weight | | 25 grams. |
| Mesh size | | Powder. |
| Agitation: | | |
| Speed | Low | High. |
| Temperature (jacket) | 16° C | 11° C. |
| Yield, monosilane | 2% | 57%. |
| Reaction period | 3 hrs | 5 hrs. |

Example IV

Note.—This example illustrates the reduction of various halogen-substituted silanes. The apparatus and procedure used as that of Example I. The sodium hydride used was wet with mineral oil and it weighed 9.3 gms. On a dry basis, this is equivalent to 4.6 mgs. of NaH, or 0.2 gm. mol.

| Run No | 30 | 31 | 32 | 33 | 34 | 35 [1] |
|---|---|---|---|---|---|---|
| Halo-silane | $Si(CH_3)Cl_3$ | $Si(CH_3)Cl_3$ | $Si_2Cl_6$ | $Si_2Cl_6$ | $SiHCl_3$ | $SiBr_4$. |
| Moles used | 0.067 | 0.067 | 0.033 | 0.033 | 0.067 | 0.05. |
| Catalyst | $ZnCl_2$ | $ZnCl_2$ | $ZnCl_2$ | $ZnCl_2$ | $ZnCl_2$ | $ZnCl_2$. |
| Molar ratio Zn halo-silane | 3:8 | 3:8 | 3:4 | 1:2 | 3:8 | 1:2. |
| Reaction slurry liquid | THF | THF | THF | THF | THF | THF. |
| Volume of liquid | 20 ml | 20 ml | 20 ml | 43 ml | 35 ml | 35 ml. |
| Attritive material | None | NaCl | None | NaCl | NaCl | NaCl. |
| Weight | | 25 g | | 25 g | 25 g | 25 g. |
| Mesh size | | Powder | | Powder | Powder | Powder. |
| Agitation: | | | | | | |
| Speed | Low/high | High | Low/high | High | High | High. |
| Time (hours) | 4/2½ | | 3/2 | | | |
| Temperature (jacket) | 16°C | 15°C | 16°C | 20°C | 12°C | 12°C. |
| Cold condenser temp | −50°C | −50°C | 0°C | 0°C | | |
| Reaction period | 6½ hrs | 1½ hrs | 5 hrs | 1½ hrs | 2 hrs | 3 hrs. |
| Yield | 63% | 85% | 34% | 41% | 87% | 97%. |
| Product | $(CH_3)SiH_3$ | $(CH_3)SiH_3$ | $Si_2H_6$, $SiH_4$, and higher silanes | $Si_2H_6$, $SiH_4$, and higher silanes | $SiH_4$ | $SiH_4$. |

[1] NaH—dry p.p.t. on surface of NaCl powder (0.2 gm. mol).

One of the unusual and unexpected aspects of this invention is that boron halides, which are often present as impurities in halogen-substituted silane compounds, remain in the reactor in the form of stable, non-volatile boro-hydrides of the alkanlinous metal, while the end product silane leaves the reactor as a vapor substantially free from contamination. The production of a silane, such as monosilane that has been simultaneously purified with respect to boron contamination, is very advantageous, since the product is especially useful in the manufacture of semiconductor quality silicon. This simultaneous removal of boron is illustrated in Example V below.

Example V

Using the apparatus and general procedure of Example I, 5.4 ml. of SiCl₄ adulterated with 1.69 ml. of BF₃ etherate complex (48% BF₃ by weight) was introduced, over a 15-minute period, into a reaction mixture containing 9.3 gm. NaH wet with mineral oil (4.6 gms. of dry NaH)
25 gm. rock salt powder (−100 mesh)
3.4 gm. $ZnCl_2$
20 ml. tetrahydrofuran During the introduction of the SiCl₄, the mixture was being stirred at high speed with the disc type agitator, and the reaction vessel was cooled with water in the jacket at 6° C. About 90 minutes after the SiCl₄ was added, the viscosity of the reaction slurry mixture was checked by Brookfield (rotating spindle) viscosimeter, giving a reading of approximately 100,000 c.p.s. (centipoise-seconds) at 6 r.p.m., and a reading of approximately 10,000 c.p.s. at 60 r.p.m. was obtained. The lower value at the higher rotation speed indicates that the slurry is highly thixotropic. The check reading on glycerol at room temperature was 1000 c.p.s.

After 1½ hours a monosilane yield of 95% was obtained. The product silane was burned in oxygen, and the combustion products were absorbed in water and analyzed for boron by spectrographic methods. No boron was detected by methods capable of detecting 10 p.p.m. of boron based on Si.

The alkalinous metal hydrides that can be used in this invention include the salt-like hydrides of both the alkali metal and the alkaline earth metals. Alkali metal hydrides that may be used include sodium hydride (a preferred material), potassium hydride, rubidium hydride, and cesium hydride. Among the alkaline earth metals that are contemplated for use in this invention are calcium hydride, strontium hydride, barium hydride, and magnesium hydride. Mixtures of any of the alkalinous metal hydrides are also useful. All of these metal hydrides react in the solid state, and for this reason it is preferred to use such materials in finely divided form. The metal hydride reactant may be incorporated with the reaction medium as a dry powder or as finely dispersed particles distributed on the surface of inert salts (as, for example, sodium chloride). Also, as will be seen from the foregoing working examples, the sodium hydride may be in the form of a powder wetted with oil to protect it from atmospheric deterioration. This latter form, while granular in appearance, is dispersible to its original finely divided particle size of about 5 microns (dia.).

The halogen-substituted silane compounds useful in the process of the invention include the tetrahalosilanes, as for example $SiF_4$, $SiCl_4$, $SiBr_4$, $SiCl_3Br$, and $SiI_4$; the trihalosilanes, as for example, $SiHCl_3$, $SiHBr_3$, and $SiHI_3$; the dihalogen-substituted and monohalogen-substituted silanes, as for example $SiH_2Cl_2$, and $SiH_3Cl$; the alkyl halosilanes, as for example $(CH_3)_3ClSi$, $(CH_3)_2Cl_2Si$, $(C_2H_5)Br_3Si$; aryl halosilanes, as for example $(C_6H_5)Cl_3Si$, and $(C_6H_5)_3BrSi$; the halopolysilanes, as for example, $Si_2Cl_6$, $Si_2I_6$, $Si_3Br_8$, and $Si_6Cl_{10}$, the alkyl halopolysilanes, as for example $Si_2Cl_4(CH_3)_2$. The halogen-substituted silanes are preferably introduced to the reaction vessel as liquid. However, if desired, these reactants may be introduced in an ether solution, or in the gaseous state.

There is a wide variety of zinc catalysts available for use in this invention. These include the zinc halides such as zinc bromide, zinc iodide, zinc fluoride, particularly zinc chloride. Other zinc materials that are suitable as catalysts are zinc metal, zinc alloys, zinc carboxylates, zinc carbonate, zinc oxide, zinc alkyls, such as $(CH_3)_2Zn$, $(C_2H_5)_2Zn$ and zinc hydride. The zinc catalyst is preferably used in finely divided form, and, as can be seen from the previous description of this invention, it is usually added to the reaction vessel along with the ether and solid reactants.

Ethers suitable for use in the process of this invention are those having an appreciable solvent action on the halogen-substituted silane compound. Examples of ethers that may be used include tetrahydrofuran, diethyleneglycoldimethyl ether, ethyleneglycoldimethyl ether, 1,4 dioxane, diethyl ether, dipropyl ether, diisopropyl ether, triethyleneglycoldimethyl ether, tetraethyleneglycoldimethyl ether, dichlorodiethyl ether, and the like. Of these ethers, tetrahydrofuran is preferred. If desired, the ethers may be diluted with an inert organic liquid such as kerosene, heptane, or the like. Such diluents are convenient to use when by-product alkalinous metal halide has thickened the reaction mixture to the extent that effective agitation is impaired.

The reaction is carried out in a fluid reaction medium. Therefore, temperatures in the system should be controlled so as to maintain a substantial amount of liquid in the reaction vessel at all times. Since the reaction is exothermic, control of temperature is accomplished by cooling of the reaction vessel and use of a cold reflux condenser. It is preferred not to boil the liquid reaction mixture since it has been found that temperatures near the boiling point result in cavitation, thus making it difficult to obtain the desired solid-liquid contact. Although the reaction will proceed at temperatures below 0° C., the latter temperature appears to be the lowest practical limit if substantial yields are to be obtained in the shortest possible time. When higher boiling ethers are used, one may take advantage of the improved catalytic effect obtainable at high temperatures and temperatures may range up to 200° C. or higher, depending on the materials used. However, reaction temperatures of from 5° C. to 35° C. are very effective, and these are preferred for convenience and simplicity of operation.

As previously disclosed, a preferred embodiment of this invention contemplates forming the reaction mass into a viscous slurry by the addition of a grinding agent such as rock salt, and this viscous slurry is agitated during the reaction to expose fresh reaction surfaces on the metal hydride. It is preferred to keep the viscosity of the slurry as high as possible without allowing it to become so thick that effective agitation cannot be maintained. One skilled in the art can maintain this control by visual observation. If viscosity is considered to be too high, adjustment is made by adding additional ether or a liquid diluent such as kerosene, heptane, etc. On the other hand, when the slurry is so thin that effective grinding of the sodium hydride is not being obtained, thickening can be accomplished by the addition of more of the grinding agent. The choice of grinding agent is not particularly critical providing one chooses a non-contaminating, insoluble material that will exert an attritive action on the metal hydride. Examples of these attritive materials are such inerts as quartz or ilmenite sand; ground fire brick, salts such as the insoluble reaction product salts, as for example NaCl, NaBr, $CaCl_2$, metal particles, such as steel, aluminum, titanium, zinc, or the like. As will be seen from run No. 23 in Example I, an attritive agent containing zinc can also serve the function of the catalyst. While not critical, in general a particle size in the range of −20 to +200 mesh is preferred for the attritive material. The amount of such material used to obtain effective attritive action will of course vary over a wide range depending upon the reactants, the type of agitation used, and the particular attritive material that is chosen. For example, when $SiO_2$ or NaCl is used as the attritive material, the weight ratio compared to the metal hydride can vary over a range of from 1:1 to 25:1, or more, depending on the other materials in the reaction slurry. The speed of agitation when using an attritive agent can be varied from a few hundred r.p.m. to several thousand. However, high speed agitation is particularly effective in improving yield, when attritive agent is used.

The reaction should be carried out under non-contaminating conditions, which means that oxygen and moisture should be excluded from the reaction system. As previously pointed out, the presence of oxygen is dangerous since the end product silane and oxygen can form an explosive mixture. Non-contaminating conditions can be attained by using dry reactants and purging the system with an uncontaminating gas such as nitrogen, argon, or helium. Such conditions can also be attained by carrying out the reaction in a completely closed system which has been purged with a non-contaminating gas and then evacuated to remove any residual oxygen or moisture.

The process of the invention has many advantages. Among these are the minimum amount of ether required and the low cost of the reducing agent and catalyst materials, which enables production of the products at a very marked reduction in cost as compared with other processes for high-purity silane production. In particular, monosilane produced from silicon tetrachloride is low in cost and of the highest purity, being especially free from boron.

Since it is obvious that many changes and modifications can be made in the above-described details without departing from the nature and spirit of the invention, it is to be understood that the invention is not to be limited to said details except as set forth in the appended claims.

I claim:

1. A process for substituting hydrogen for silicon-bonded halogen atoms in a halogen-substituted silane comprising contacting an alkalinous metal hydride selected from the group consisting of sodium hydride and calcium hydride with said silane under non-contaminating conditions and in the presence of an ether reaction medium selected from the group consisting of tetrahydrofuran, ethyleneglycoldimethyl ether, diethyleneglycoldimethyl ether, triethyleneglycoldimethyl ether, tetraethyleneglycoldimethyl ether, diethyl ether, 1,4-dioxane, dipropyl ether, diisopropyl ether, and dichlorodiethyl ether, and in the presence of a zinc catalyst selected from the group consisting of zinc halides, zinc metal, zinc alloys, zinc carboxylates, zinc carbonate, zinc oxide, zinc alkyls, and zinc hydride.

2. A process for the production of monosilane comprising contacting an alkalinous metal hydride selected from the group consisting of sodium hydride and calcium hydride with a silicon tetrahalide under non-contaminating conditions and in the presence of an ether reaction medium selected from the group consisting of tetrahydrofuran, ethyleneglycoldimethyl ether, diethyleneglycoldimethyl ether, triethyleneglycoldimethyl ether, tetraethyleneglycoldimethyl ether, diethyl ether, 1,4-dioxane, dipropyl ether, diisopropyl ether, and dichlorodiethyl ether, and in the presence of a zinc catalyst selected from the group consisting of zinc halides, zinc metal, zinc alloys, zinc carboxylates, zinc carbonate, zinc oxide, zinc alkyls, and zinc hydride.

3. The process of claim 2 wherein the alkalinous metal hydride is sodium hydride and the silicon tetrahalide is silicon tetrachloride.

4. A process for the production of monosilane comprising agitating under non-contaminating conditions a reaction slurry consisting essentially of an ether reaction medium selected from the group consisting of tetrahydrofuran, ethyleneglycoldimethyl ether, diethyleneglycoldimethyl ether, triethyleneglycoldimethyl ether, tetraethyleneglycoldimethyl ether, diethyl ether, 1,4-dioxane, dipropyl ether, diisopropyl ether, and dichlorodiethyl ether, a zinc catalyst selected from the group consisting of zinc halides, zinc metal, zinc alloys, zinc carboxylates, zinc carbonate, zinc oxide, zinc alkyl, and zinc hydride, an attritive agent, a silicon tetrahalide, and an alkalinous metal hydride selected from the group consisting of sodium hydride and calcium hydride in at least a stoichiometric amount based on the conversion of the silicon halide to silane.

5. The process of claim 4 wherein the alkalinous metal hydride is sodium hydride and the silicon tetrahalide is silicon tetrachloride.

6. A process for substituting hydrogen for silicon-bonded halogen atoms in a halogen-substituted silane comprising contacting a hydride of an alkalinous metal having an atomic number greater than 4 with said silane under non-contaminating conditions and in the presence of an ether reaction medium and a zinc catalyst.

7. A process for substituting hydrogen for silicon-bonded halogen atoms in a halogen-substituted silane comprising agitating under non-contaminating conditions a reaction slurry consisting essentially of an ether reaction medium, a zinc catalyst, an attractive agent, a halogen-substituted silane, and a hydride of an alkalinous metal having an atomic number greater than 4.

8. A process for the production of monosilane comprising contacting under non-contaminating conditions silicon tetrachloride and at least a stoichiometric amount of sodium hydride based on the conversion of $CiCl_4$ to $SiH_4$ and in the presence of tetrahydrofuran as a liquid reaction medium and zinc chloride as a catalyst.

9. A process for the production of monosilane comprising contacting under non-contaminating conditions silicon tetrachloride and at least a stoichiometric amount of sodium hydride based on the conversion of $SiCl_4$ to $SiH_4$ and in the presence of tetrahydrofuran as a liquid reaction medium and an inert liquid diluent for said reaction medium, and zinc chloride as a catalyst.

10. A process for the production of monosilane comprising agitating under non-contaminating conditions a reaction slurry consisting essentially of tetrahydrofuran as a liquid reaction medium, zinc chloride as a catalyst, an attritive agent, silicon tetrachloride, and sodium hydride in at least a stoichiometric amount based on the conversion of the silicon tetrachloride to silane.

11. A process for the production of monosilane comprising agitating under non-contaminating conditions a reaction slurry consisting essentially of tetrahydrofuran as a liquid reaction medium and an inert liquid diluent for said tetrahydrofuran, zinc chloride as a catalyst, an attritive agent, silicon tetrachloride, and sodium hydride in at least a stoichiometric amount based on the conversion of the silicon tetrachloride to silane.

12. A process for the production of monosilane comprising contacting under non-contaminating conditions silicon tetrachloride and at least a stoichiometric amount of calcium hydride based on the conversion of $SiCl_4$ to $SiH_4$ and in the presence of tetrahydrofuran as a liquid reaction medium and zinc chloride as a catalyst.

13. A process for the production of monosilane comprising agitating under non-contaminating conditions a reaction slurry consisting essentially of tetrahydrofuran as a liquid reaction medium, zinc chloride as a catalyst, an attritive agent, silicon tetrachloride, and magnesium hydride in at least a stoichiometric amount based on the conversion of the silicon tetrachloride to silane.

References Cited in the file of this patent

FOREIGN PATENTS

| | | |
|---|---|---|
| 1,181,025 | France | Jan. 5, 1959 |
| 1,182,797 | France | Jan. 19, 1959 |

OTHER REFERENCES

Wiberg: "New Results in Preparative Hydride Research," page 21, AEC-tr-1931, Apr. 8, 1954, published by Technical Information Service of the A.E.C.

Finholt et al.: "Journal of the American Chemical Society," vol. 69, pages 2692–2696 (November 1947).

UNITED STATES PATENT OFFICE
CERTIFICATE OF CORRECTION

Patent No. 3,050,366                              August 21, 1962

Owen E. Ringwald

It is hereby certified that error appears in the above numbered patent requiring correction and that the said Letters Patent should read as corrected below.

Column 9, line 49, for "attractive" read -- attritive --; column 10, line 2, "$CiCl_4$" read -- $SiCl_4$ --.

Signed and sealed this 4th day of December 1962.

(SEAL)
Attest:

ERNEST W. SWIDER                              DAVID L. LADD
Attesting Officer                                   Commissioner of Patents